US011605971B2

(12) United States Patent
Xu et al.

(10) Patent No.: US 11,605,971 B2
(45) Date of Patent: Mar. 14, 2023

(54) INPUT REDUNDANT POWER SUPPLY WITH ZERO CURRENT SWITCHING

(71) Applicant: Flex Ltd., Singapore (SG)

(72) Inventors: HuaMin Xu, Shenzhen (CN); Weijia Yan, Shenzhen (CN)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 17/230,228

(22) Filed: Apr. 14, 2021

(65) Prior Publication Data
US 2022/0158485 A1    May 19, 2022

(30) Foreign Application Priority Data

Nov. 17, 2020    (CN) .......................... 202011297818.6

(51) Int. Cl.
H02J 9/06    (2006.01)
H02M 1/42    (2007.01)

(52) U.S. Cl.
CPC ........... *H02J 9/068* (2020.01); *H02M 1/4208* (2013.01)

(58) Field of Classification Search
CPC .. H02J 9/061; H02J 9/068; H02J 1/10; H02M 1/10; H02M 1/325
See application file for complete search history.

(56) References Cited

U.S. PATENT DOCUMENTS

| 10,340,685 | B2 | 7/2019 | Cheng | |
| 2012/0051097 | A1* | 3/2012 | Zhang | H02M 3/158 363/21.07 |
| 2015/0109708 | A1* | 4/2015 | Cheng | H02M 1/10 361/93.9 |
| 2017/0329380 | A1* | 11/2017 | Hung | H02M 1/36 |
| 2018/0097442 | A1* | 4/2018 | Niu | G05F 5/00 |
| 2020/0076228 | A1 | 3/2020 | Peng et al. | |

* cited by examiner

Primary Examiner — Rexford N Barnie
Assistant Examiner — Rasem Mourad
(74) Attorney, Agent, or Firm — Sheridan Ross P.C.

(57) ABSTRACT

An input redundant power supply circuit includes a power converter, a relay switch unit including a first relay circuit coupled to a first power source and a second relay circuit coupled to a second power source, a control unit configured to control the relay switch unit so that the power converter is supplied power by the first or second power source, a high capacity capacitor powered by the power converter and a step-up converter coupled between the power converter and the high capacity capacitor. The step-up converter maintains a voltage across the high capacity capacitor higher than a voltage of the first power source or a voltage of the second power source when the relay switch unit switches from one of the first power source and the second power source to the other of the first power source and the second power source.

20 Claims, 7 Drawing Sheets

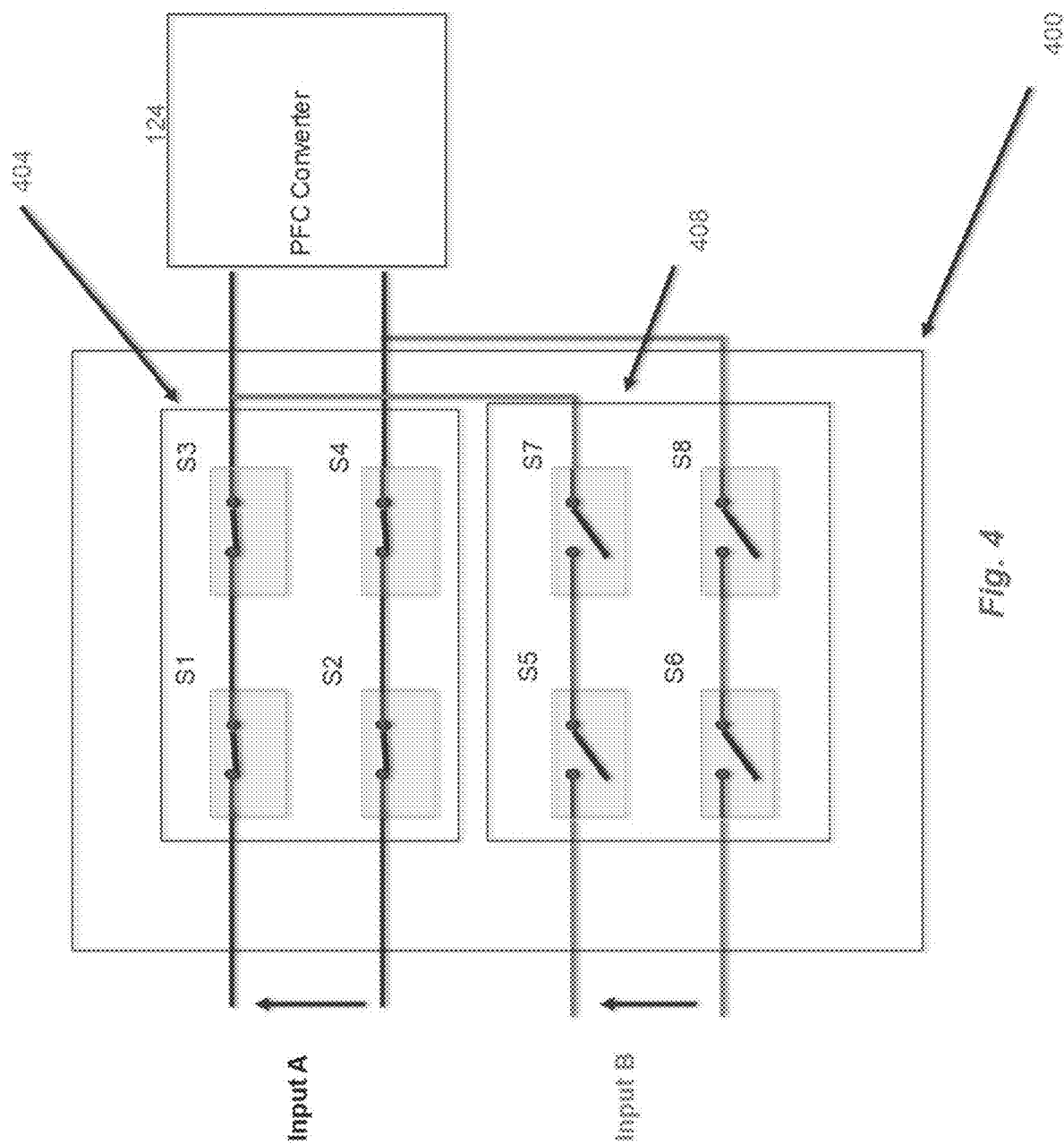

INPUT REDUNDANT POWER SUPPLY WITH ZERO CURRENT SWITCHING

CROSS REFERENCE TO RELATED APPLICATION

The present application claims the benefit of and priority to Chinese Patent Application No 202011297818.6 filed Nov. 17, 2020, the entire disclosure of which is hereby incorporated by reference for all that it teaches and for all purposes.

FIELD

The present disclosure is generally directed to power supply switching in power distribution systems, and more particular to an input redundant power supply with an automatic transfer switching (ATS) circuit and control methods.

BACKGROUND

Relay switches deployed in power distribution systems may be operable to selectively supply power to a load or to interrupt power to the load. When one power supply of multiple power supplies becomes abnormal, the relay switches are used to switch from the abnormal power supply to the other power supply in order to continue supplying power to the load. During this relay switching process, a high instantaneous current, such as an inrush current or a high surge current, may be generated due to an input voltage provided by the power supply being greater than an output voltage. More particularly, this instantaneous current is likely to exceed the tolerance of the relay switches, and the electrical contacts of the relay switches may be worn due to the opening and closing of the relay switches.

BRIEF DESCRIPTION OF THE DRAWINGS

FIG. 4 shows a schematic diagram of an alternative automatic transfer switching (ATS) relay unit in accordance with embodiments of the present disclosure;

SUMMARY

Figure 1:
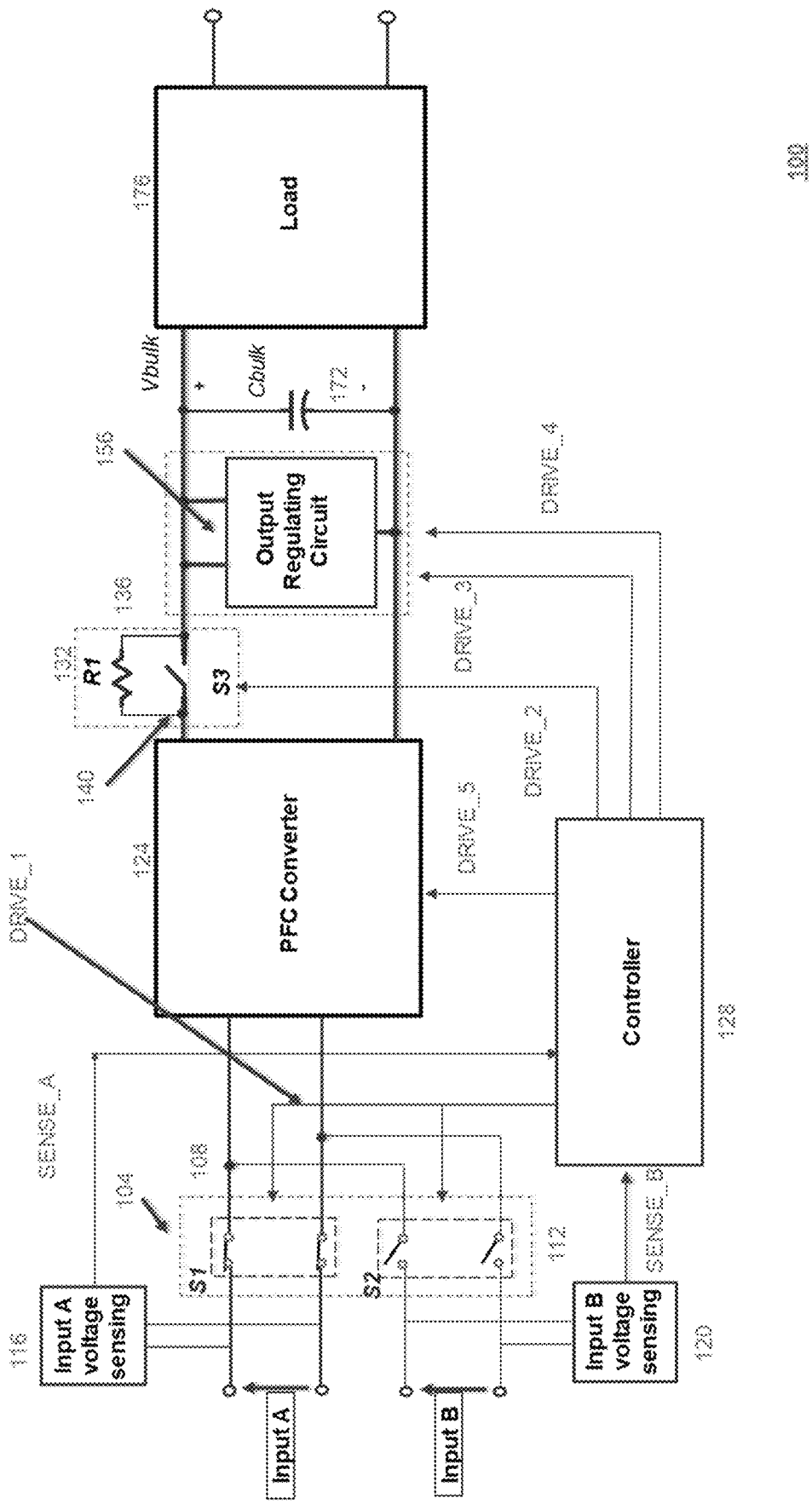
FIG. 1 shows a schematic diagram of an input redundant power supply circuit in accordance with embodiments of the present disclosure.

At least one example embodiment is directed to an input redundant power supply circuit including a power converter, a relay switch unit, a control unit, a high capacity capacitor and a step-up converter. The relay switch unit includes a first relay circuit coupled to a first power source and a second relay circuit coupled to a second power source. The control unit is configured to control the relay switch unit so that the power converter is supplied power by the first power source or the second power source. The high capacity capacitor is powered by the power converter and the step-up converter is coupled between the power converter and the high capacity capacitor. The step-up converter maintains a voltage across the high capacity capacitor higher than a voltage of the first power source or a voltage of the second power source when the relay switch unit switches from one of the first power source and the second power source to the other of the first power source and the second power source.

At least one example embodiment is directed to a method of controlling an input redundant power supply circuit, including detecting that a relay switch of a primary power source that supplies power to a load via a high capacity capacitor is closed and a relay switch of a secondary power source is open, determining that a failure has occurred with the primary power source, enabling a step-up converter and maintaining by the step-up converter a voltage across the high capacity capacitor higher than a voltage of the secondary power source when the relay switch of the primary power source is open and the relay switch of the secondary power source is closed.

At least one example embodiment is directed to a method of controlling an input redundant power supply circuit, including detecting that a relay switch of a primary power source that supplies power to a load via a high capacity capacitor is closed and a relay switch of a secondary power source is open, determining that a failure has occurred with the primary power source, disconnecting an additional power source supplied with power from the primary power source from the high capacity capacitor, enabling a step-up converter and maintaining by the step-up converter a voltage across the high capacity capacitor higher than a voltage of the secondary power source when the relay switch of the primary power source is open and the relay switch of the secondary power source is closed. The voltage from the additional power source is added to the voltage of the high capacity capacitor to maintain the voltage across the high capacity capacitor higher than the voltage of the secondary power source. The method also includes limiting charging of the additional power source to prevent a surge current on the relay switches when connecting the additional power source to the high capacity capacitor after the relay switch of the primary power source is open and the relay switch of the secondary power source is closed.

The input redundant power supply circuit and the controlling method thereof provided by the embodiments of the present disclosure achieves that the relay switches switch at zero current conditions.

DETAILED DESCRIPTION

Embodiments of the present disclosure will be described in connection with an input redundant power supply circuit.

FIG. 1 shows a schematic diagram of an input redundant power supply circuit in accordance with embodiments of the present disclosure. The input redundant power supply circuit 100 includes an automatic transfer switching (ATS) relay unit 104 including a relay circuit 108 with relay switch S1 and a relay circuit 112 with relay switch S2, an INPUT_A voltage sensing circuit 116, an INPUT_B voltage sensing circuit 120, a power factor correction (PFC) converter 124 and a controller 128. The relay circuit 108 is coupled to an input voltage INPUT_A and the relay circuit 112 is coupled to an input voltage INPUT_B. It should be noted that the input voltage INPUT_A and the input voltage INPUT_B may be two AC input voltages, an AC input voltage and a high-voltage DC input voltage (such as 240V DC), or two high-voltage DC input voltages (such as 240V DC).

The INPUT_A voltage sensing circuit 116 is coupled between the relay circuit 108 and the input voltage INPUT_A and is used to sense whether the input voltage INPUT_A works properly. The INPUT_A voltage sensing circuit 116 subsequently supplies a sensing signal SENSE_A for indicating whether the input voltage INPUT_A works properly to the controller 128. Likewise, the INPUT_B voltage sensing circuit 120 is coupled between the relay circuit 112 and the input voltage INPUT_B and is used to sense whether the input voltage INPUT_B works properly. The INPUT_B voltage sensing circuit 120 subsequently supplies a sensing signal SENSE_B for indicating whether the input voltage INPUT_B works properly to the controller 128. The details of the INPUT_A voltage sensing circuit 116 and the INPUT_B sensing circuit 120 may be achieved in a way well-known to those skilled in the art, which is not described in detail herein. A drive signal DRIVE_1 from the controller 128, activates the ATS relay unit 104 such that the relay circuit 108 and the relay circuit 112 OPENS or CLOSES relay switches S1 and S2, respectively, such that either the input voltage INPUT_A or the input voltage INPUT_B is coupled to the PFC converter 124. The PFC converter 124 increases the input voltage (AC or DC) to a high DC voltage.

The input redundant power supply circuit 100 further includes an inrush current limit circuit 132, an output regulating circuit 156, a $C_{bulk}$ capacitor 172 and a load 176. The inrush current limit circuit 132 includes an R1 resister 136 and an S3 relay switch 140. The inrush current limit circuit 132 is coupled to the PFC converter 124 and includes the R1 resistor 136 in parallel with the S3 relay switch 140. According to one embodiment of the present disclosure, the inrush current limit circuit 132 is used for inrush current limiting during the power up process. The S3 relay switch 140 is a normally OPENED relay switch but the relay switch is always CLOSED when the power supply is in operation so that the power from the power supply flows through the S3 relay switch 140 instead of the R1 resistor 136. The R1 resistor 136 may be a common resistor or a thermal resistor. A drive signal DRIVE_2 from the controller 128, activates the S3 relay switch 140 to either OPEN or CLOSE. Furthermore, a drive signal DRIVE_3 from the controller 128 turns ON and OFF the PFC converter 124. According to one embodiment of the present disclosure, the load 176 may be a DC/DC converter or a DC/AC converter. Alternatively, the output may be a high voltage DC output.

Figure 3A:
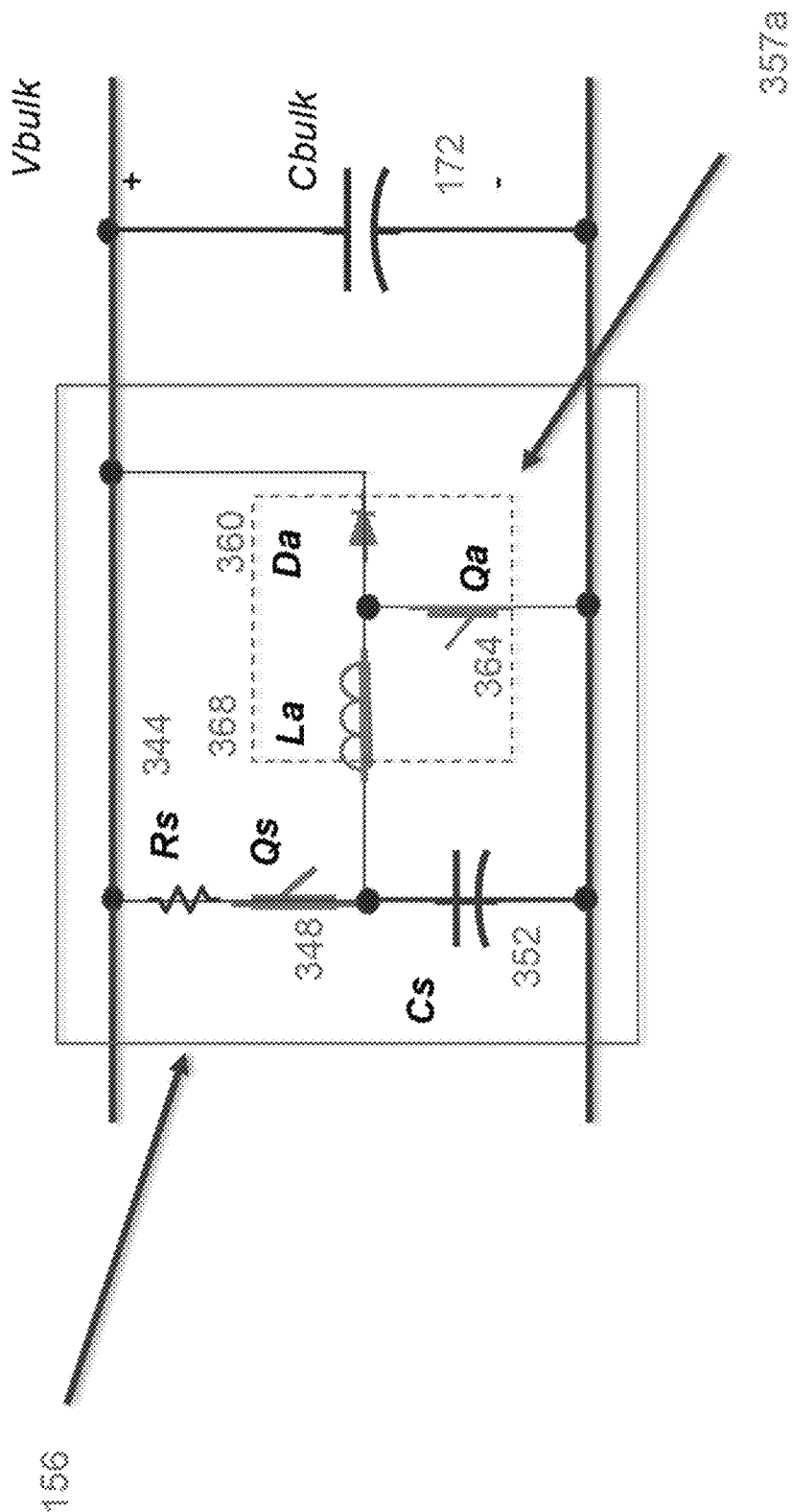
FIGS. 3a and 3b show schematic diagrams of output regulating circuits in accordance with embodiments of the present disclosure.
Figure 3B:
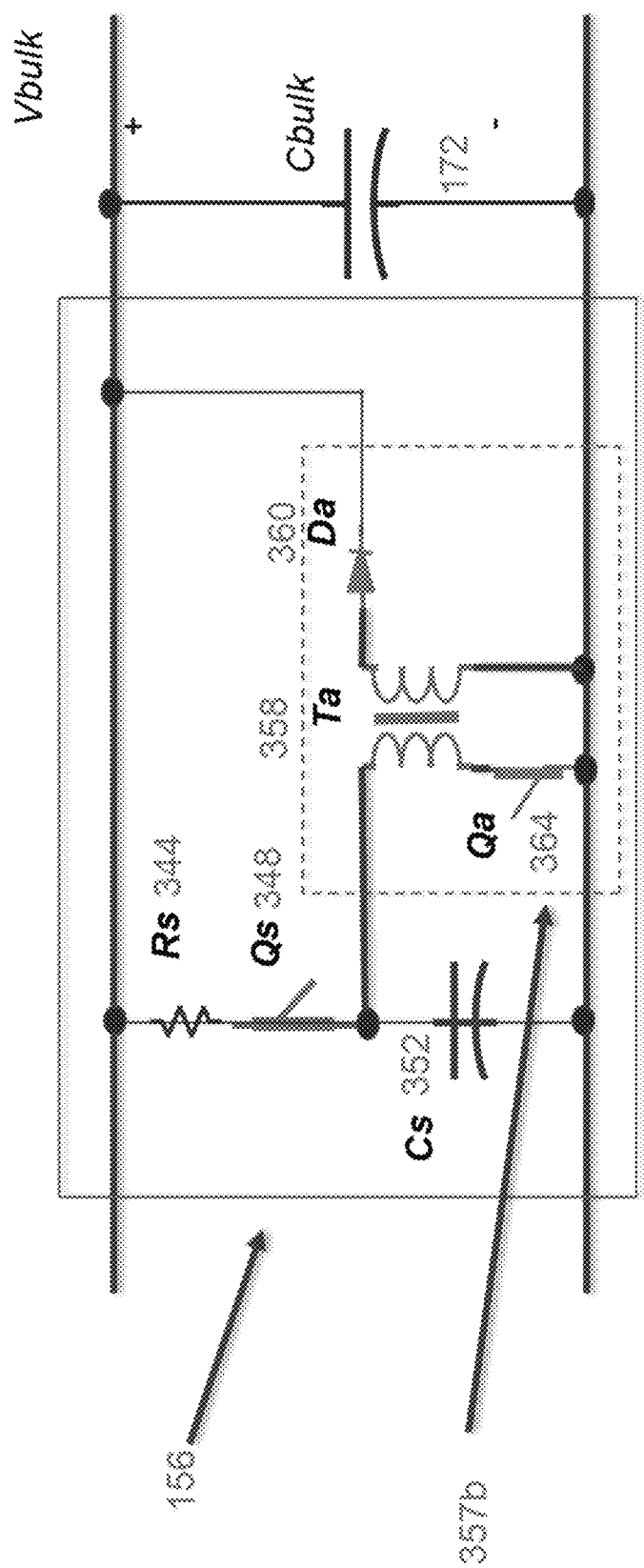

As illustrated in FIGS. 3a and 3b, the output regulating circuit 156 incudes a step-up converter 357a, 357b in combination with a Rs resistor 344, a Qs switch 348 and a Cs capacitor 352. As illustrated in FIG. 3a, step-up converter 357a includes a Da diode 360, a Qa transistor 364 and a La inductor 368 (referred to generally as a boost converter), while in FIG. 3b the step-up converter 357b includes a Da diode 360, a Qa transistor 364 and a Ta transformer 358 (referred to generally as an isolated switching converter). Although two types of step-up converters are described above, other types of step-up converters can be used without departing from the spirit and scope of the present disclosure. The Cs capacitor 352 is an energy store capacitor for the $C_{bulk}$ capacitor 172 during the interruption of the input source.

A drive signal DRIVE_4 from the controller 128, activates the Qs switch 348 to either OPEN or CLOSE. Moreover, a drive signal DRIVE_5 from the controller 128 (typically a conventional pulse width modulation (PWM) signal), activates the Qa transistor 364 to be in either the OPEN or the CLOSE state. The Qa transistor 364 is a semiconductor switch and is, for example but not limited to, a metal-oxide-semiconductor field-effect transistor (MOSFET) or an insulated gate bipolar transistor (IGBT). Although, the Rs resistor 344, the Qs switch 348 and the Cs capacitor 352 are part of the output regulating circuit 156, these components can be provided as separate components. Likewise, although the step-up converter 357a includes the Da diode 360, the Qa transistor 364 and the La inductor 368 and the step-up converter 357b includes the Da diode 360, the Ta transformer 358 and the Qa transistor 354, these components also can be provided as separate components.

According to one embodiment of the operation of the input redundant power supply circuit 100 of the present disclosure, when the input voltage INPUT_A is the primary or default input voltage source, the input voltage INPUT_B is the secondary or backup input voltage source. According to an alternative embodiment of the present disclosure, the input voltage INPUT_B can also act as a primary input voltage source. Both of the input voltage sources can be either an AC or a DC input voltage source. Alternatively, one of the input voltage sources can be an AC input voltage source while the other of the input voltage sources can be a DC input voltage source. The INPUT_A voltage sensing circuit 116 is used for voltage monitoring for the input voltage INPUT_A. The sensing signal SENSE_A generated by the INPUT_A voltage sensing circuit 116 is sent to the controller 128. The sensing signal SENSE_B generated by the INPUT_B voltage sensing circuit 120 is sent to the controller 128.

The relay circuit 108 is provided for the input voltage INPUT_A and is used for coupling or decoupling the input voltage INPUT_A with the PFC converter 124 and the load 176. Alternatively, the relay circuit 112 is provided for the input voltage INPUT_B and is used for coupling or decoupling the input voltage INPUT_B with the PFC converter 124 and the load 176. The relay switches S1 and S2 can take various forms as discussed in greater detail below. Besides input voltage monitoring, the controller 128 also controls the ATS relay unit 104 as well as the PFC converter 124. Although one controller is illustrated in the figures, the ATS relay unit 104 and/or the PFC converter 124 can be controlled with separate controllers or multiple controllers without departing from the spirit and scope of the present disclosure.

The PFC converter 124 is provided for power factor correction. According to one embodiment of the present disclosure, the PFC converter 124 regulates the input AC or DC voltage source of input voltages INPUT_A and INPUT_B provided by the ATS relay unit 104 to a high DC voltage $V_{bulk}$ (output voltage) which is provided across the Co capacitor 172. Thus, the $C_{bulk}$ capacitor 172 is powered by the PFC converter 124 through the inrush current limit circuit 132 to generate the output voltage $V_{bulk}$. The output of the PFC converter 124 is coupled to the output regulating circuit 156 via the inrush current limit circuit 132. The Cs capacitor 352 is also charged by the output of the PFC converter 124 when the Qs switch 348 is in a CLOSE state during normal operations. According to an alternative embodiment of the present disclosure, the inrush current limit circuit 132 can be positioned between the ATS relay unit 104 and the PFC converter 124 instead of after the PFC converter 124. In a further alternative embodiment of the present disclosure, the inrush current limit circuit 132 can be positioned in series with the $C_{bulk}$ capacitor 172.

The relay switch S3 is in a CLOSE state after the $C_{bulk}$ capacitor 172 is peak charged. The relay switch S3 is in a CLOSE state after power is supplied from switching from the input voltage INPUT_A to the input voltage INPUT_B, or vice versa. During normal operations (when power supply is uninterrupted) or during or after the ATS process, the relay switch S3 is normally in a CLOSE state. Consequently, during the ATS process, there will be a surge current flow through the relay switch S3 to charge the $C_{bulk}$ capacitor 172 if the instantaneous input voltage is higher than the output voltage $V_{bulk}$.

During normal operations, the Qs switch 348 is normally turned ON or intermittently turned ON to keep the voltage across the Cs capacitor 352 and the voltage across the $C_{bulk}$ capacitor 172 to be approximately the same. In other words, the Qs switch 348 is normally turned ON or intermittently turned ON to charge the Cs capacitor 352 and the $C_{bulk}$ capacitor 172 to be at approximately the same level. At the same time, the step-up converter 357a, 357b is DISABLED whereby the Qa transistor 364 is in the OPEN state. Since there is no power conversion in the step-up converter 357a, 357b, the step-up converter 357a, 357b does not affect the operation of the PFC converter 124 and the output voltage $V_{bulk}$ is modulated by the PFC converter 124.

When the primary or default input voltage source (e.g., the input voltage INPUT_A) fails to normally supply power, for example an abnormal loss-voltage condition or abnormal under-voltage condition occurs, the $C_{bulk}$ capacitor 172 discharges and the voltage across the $C_{bulk}$ capacitor 172, the output voltage $V_{bulk}$, drops as the output is still provided to the load 176. According to one embodiment of the present disclosure, the controller 128 sends the driving signal DRIVE_4 to activate the Qs switch 348 to turn OFF. With the Qs switch 348 turned OFF, the Cs capacitor 352 and the $C_{bulk}$ capacitor 172 are decoupled and start discharging. At this point, the controller 128 sends driving signal DRIVE_4 to enable the step-up converter 357a, 357b to boost the energy (i.e., increase the voltage across) the Cs capacitor 352 to the regulated output voltage $V_{bulk}$. The output voltage $V_{bulk}$ is regulated by a duty cycle (D) of the Qa transistor 364 according to the formula: $V_{bulk}=VCs/(1-D)$, where the duty cycle D is varied from 0~1 As the voltage across the Cs capacitor 352 decreases due to discharging to provide power to the load 176, the duty cycle D increases to keep the output voltage $V_{bulk}$ at a regulated voltage, for example at 400V DC.

The step-up converter 357a, 357b can operate until the voltage across the Cs capacitor 352 becomes very low due to the Cs capacitor 352 discharging. Therefore, the energy stored in the Cs capacitor 352 can be provided to the load 176 as much as possible and maintain the output voltage $V_{bulk}$ always being greater than the input voltage, the input voltage INPUT_A. The required capacitance of the Cs capacitor 352 can be calculated by the formula ½ Cs $(VCs1^2-VCs2^2)=(Pout/\eta) \times Ts$, where VCs1 is the initial voltage on the Cs capacitor, VCs2 is the voltage at the end of the Cs capacitor discharging, Pout is the load power, $\eta$ is the step-up converter efficiency and Ts is the ATS total switching time over time (this depends on the input voltage failure detected time and relay switch operating time and other time delays). For example, for a 3000 W output load, an ATS total switching over time of 16 ms, a step-up converter efficiency $\eta$ of 0.9, an initial voltage on the Cs capacitor of 400V DC and an end discharging voltage of 150V DC, the required storage capacitance of the Cs capacitor would be around 980 μF. With a capacitor tolerance of 20% for example, this value could reach 1250 μF.

Afterwards, the controller 128 sends the driving signal DRIVE_3 to turn OFF the PFC converter 124. The controller 128 then sends the driving signal DRIVE_1 to activate the ATS relay unit 104 to OPEN relay switch S1 and CLOSE relay switch S2 which switches the input voltage from the input voltage INPUT_A to the input voltage INPUT_B. When the contacts from the relay switch S2 are CLOSING, due to the output voltage $V_{bulk}$ being higher than the input voltage, the input voltage INPUT_B and the PFC converter 124 are disabled and there is no current flowing to the PFC converter 124, as well as no current flowing to the Cs capacitor 352 or the $C_{bulk}$ capacitor 172. Therefore, since all of the ATS relay switches S1 and S2 work at a zero current switching condition, this enhances the relay switch reliability and switching life.

After the relay switch S2 is in a CLOSE state, the controller 128 sends the driving signal DRIVE_3 to turn ON the PFC converter 124 and the output power is provided to the load 176 by the input voltage INPUT_B and the load 176 is decoupled from the abnormal input voltage INPUT_A. After some delay, the controller 128 sends the driving signal DRIVE_5 to disable the step-up converter 357a, 357b and sends the driving signal DRIVE_4 to activate the Qs switch 348 to turn ON. Thereafter, the Cs capacitor 352 can be charged from the input voltage INPUT_B or the bulk voltage $V_{bulk}$. The current for charging the Cs capacitor 352 is limited by the Rs resistor 344. Thus, there is no surge current on the relay switches or other semiconductor devices, such as for example the Qs transistor 348 or transistors in the PFC converter 124. A similar operation occurs when switching from the input voltage INPUT_B to the input voltage INPUT_A.

Figure 2:
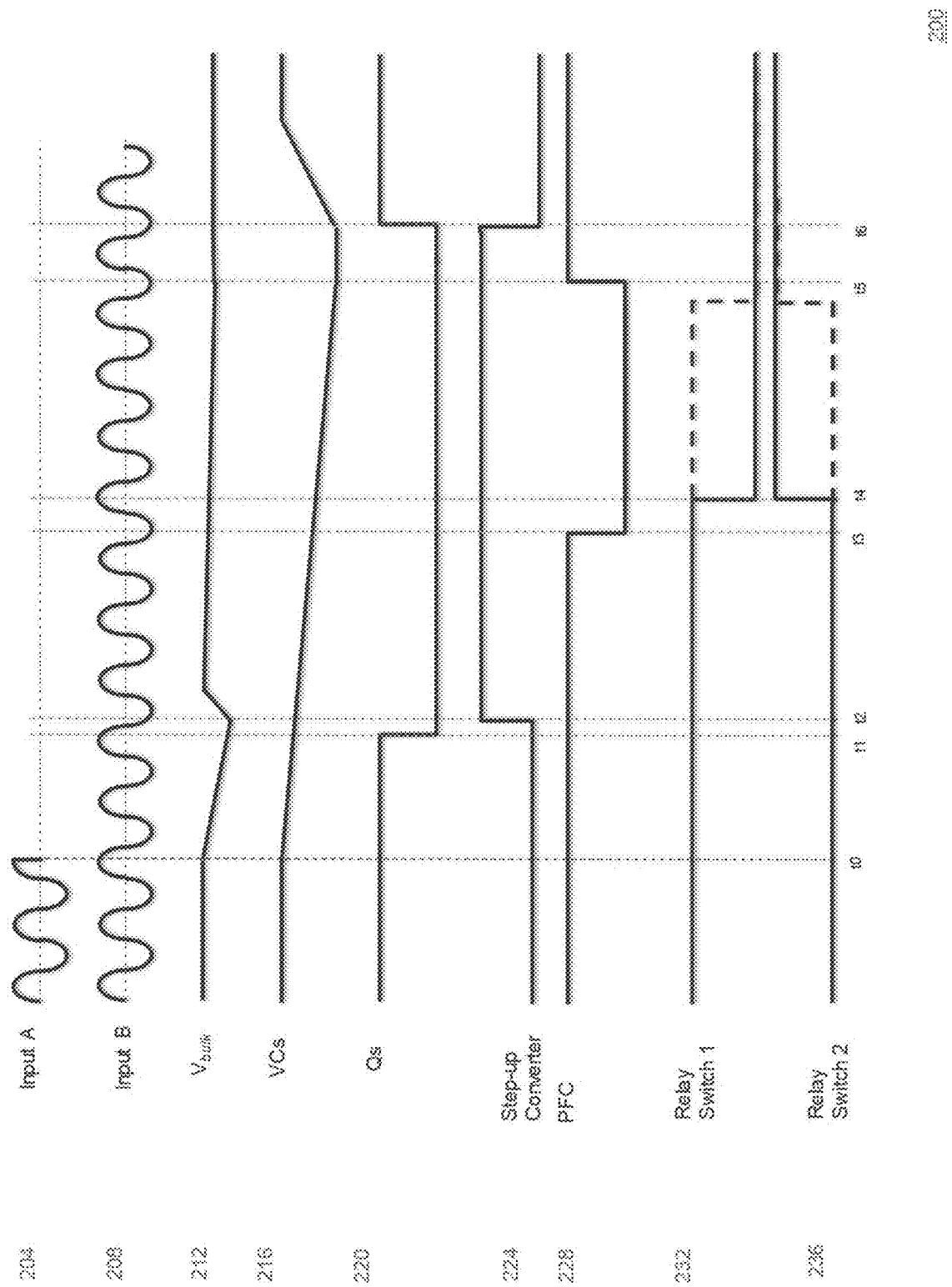
FIG. 2 shows a timing waveform graph for the operation of the input redundant power supply circuit in accordance with embodiments of the present disclosure.

FIG. 2 shows a timing waveform graph 200 for the operation of the input redundant power supply circuit 100 in accordance with embodiments of the present disclosure. As shown in FIG. 2, the waveform 204 is that of the input voltage INPUT_A, the waveform 208 is that of the input voltage INPUT_B, the waveform 212 is that of the output voltage $V_{bulk}$, the waveform 216 is that of the voltage of Cs capacitor, the waveform 220 is that of the Qs switch, the waveform 224 is that of the step-up converter, the waveform 228 is that of the PFC converter, the waveform 232 is that of the relay switch S1 and the waveform 236 is that of the relay switch S2. The input voltage INPUT_A for example is the default power source and the input voltage INPUT_B is the backup power source. As illustrated in FIG. 2, the waveform 232 shows relay switch S1 in the CLOSE state (ENABLED), coupled to the load 176 and providing energy to the load and the waveform 236 shows relay switch S2 in the OPEN state (DISABLED), acting as a backup power supply decoupled from the load. At time t0, the input voltage INPUT_A is interrupted or lost as illustrated in the waveform 204. The load, however, is still coupled to the PFC converter which still draws current from the $C_{bulk}$ capacitor and starts to decrease the output voltage $V_{bulk}$ as illustrated in the waveform 212 at time t0. Also at time t0, the voltage across the Cs capacitor also decreases as illustrated in waveform 216. At time t1, the controller monitoring the failure of the input voltage INPUT_A, turns OFF the Qs switch as illustrated in waveform 220, to decouple the Cs capacitor and the $C_{bulk}$ capacitor. At time t2, after some microsecond delay (e.g., 100 μs) from t1, the controller enables the step-up converter as illustrated in waveform 224. The step-up converter boosts the energy in the Cs capacitor to the regulated output voltage $V_{bulk}$ (e.g., 400V DC). According to one embodiment of the present disclosure, the regulated voltage is higher than the peak voltage of the input voltage source (e.g., 373 V maximum for a 264 V AC input voltage). At time 3, the controller turns OFF the PFC converter to disable the PFC converter as illustrated in the waveform 228. At time t4, the controller sends a signal to OPEN the relay switch S1 and CLOSE the relay switch S2 as illustrated in the waveforms 232 and 236, respectively. At time t4, the source power is transferred from the input voltage INPUT_A to the input voltage INPUT_B during the relay switching process. Since the PFC converter is not in operation, there is no surge current to the PFC converter; the output voltage $V_{bulk}$ is always regulated higher than the input voltage source, so there is no current to charge the $C_{bulk}$ capacitor; and the switch Qs is turned OFF during the ATS process, so there is no charge current to the Cs capacitor. Therefore, the relay switches S1 and S2 switch at zero current conditions.

At time t5, after some milliseconds that the relay switch S1 has been confirmed OPEN and the relay switch S2 has been confirmed CLOSED (as illustrated with dotted lines in the waveforms 232 and 236), the controller sends a signal to ENABLE the PFC converter as illustrated in the waveform 228 and supplies the input voltage INPUT_B to provide energy to the load. At time t6, the controller sends a signal to turn OFF the step-up converter as illustrated in the waveform 224 and sends a signal to turn ON the Qs switch as illustrated in the waveform 220 to charge the Cs capacitor. The Cs capacitor is charged for the next input transfer. The current to the Cs capacitor is limited by the Rs resistor so there is no surge current stress on the relay switches or other semiconductor devices.

According to one embodiment of the present disclosure, the controller may receive a sensing signal from input voltage INPUT_A indicating that input voltage INPUT_A has recovered. After receiving this sensing signal, the controller sends a driving signal to turn OFF the Qs switch first, sends a driving signal to ENABLE the step-up converter, and then afterwards sends a signal to DISABLE the PFC converter. The controller then sends a driving signal to the ATS relay unit to CLOSE the relay switch S1 and to OPEN the relay switch S2 to switch from the input voltage INPUT_B to the input voltage INPUT_A. After ENABLING the ATS relay unit and only after the relay switching process has been completed, the controller sends a signal to ENABLE the PFC converter. Afterwards, the controller sends a driving signal to DISABLE the step-up converter and sends a driving signal to the Qs switch to charge the Cs capacitor.

FIG. 4 shows a schematic diagram of an alternative ATS relay unit 400 in accordance with embodiments of the present disclosure. The ATS relay unit 400 includes a relay circuit 404 with individual relay switches S1-S4 and a relay circuit 408 with individual relay switches S5-S8. The relay circuit 404 is a normally CLOSED switching unit and the relay circuit 408 is a normally OPENED switching unit. The relay circuit 404 and the relay circuit 408 as shown in FIG. 4 may also realize the functions of the relay circuit 108 and the relay circuit 112, respectively, included in the input redundant power supply circuit 100 shown in FIG. 1 according to one embodiment of the present disclosure.

Figure 5:
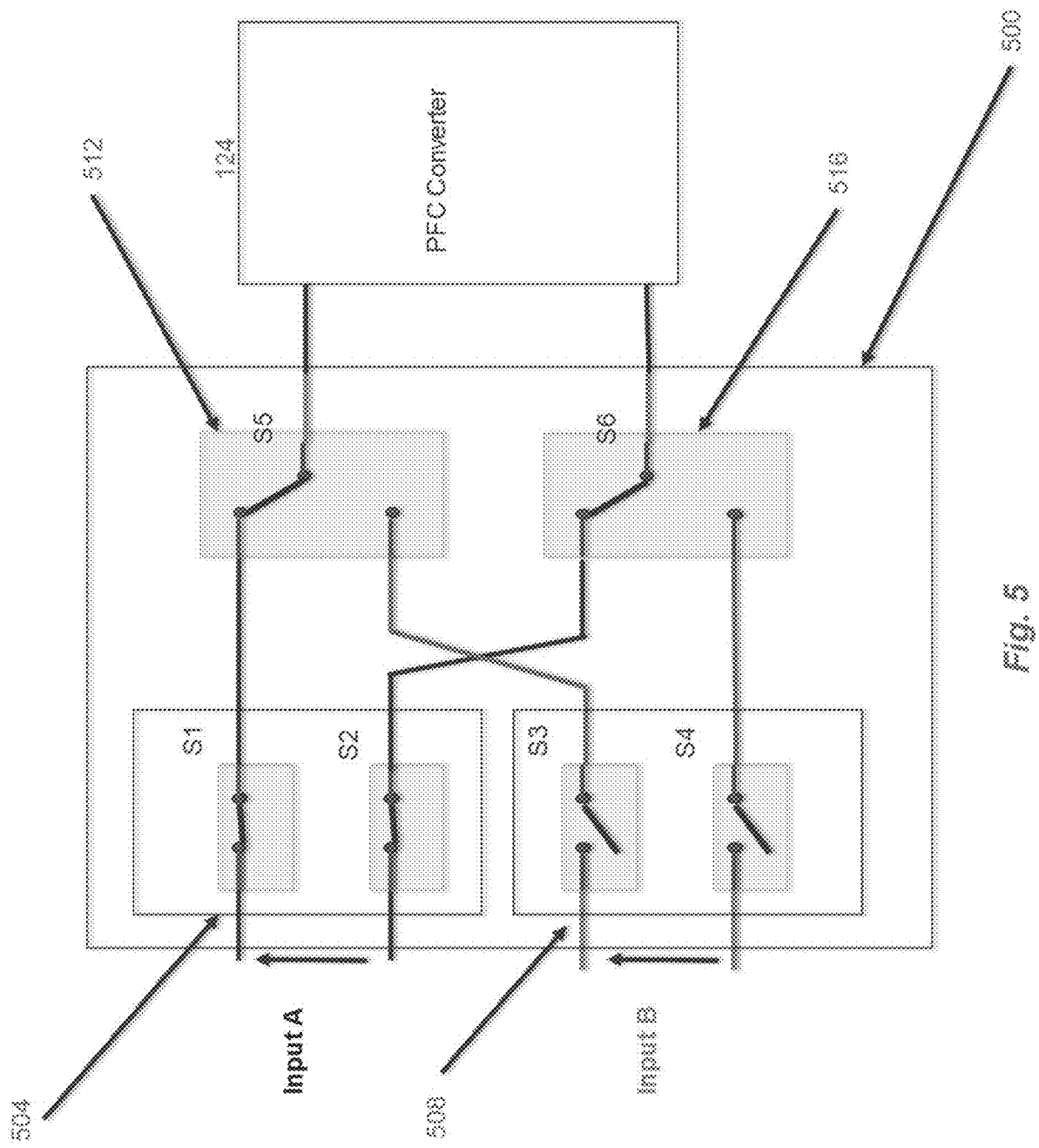
FIG. 5 shows a schematic diagram of an alternative ATS relay unit in accordance with embodiments of the present disclosure.

FIG. 5 shows a schematic diagram of an alternative ATS relay unit 500 in accordance with embodiments of the present disclosure. The ATS relay unit 500 includes a relay circuit 504 with individual relay switches S1 and S2, a relay circuit 508 with individual relay switches S3 and S4 and relay switches S5 and S6. The relay switches S5 and S6 are double-contact relay switches and constitute a double-contact relay unit. Specifically, the relay switches S5 and S6 may be single-pole double-throw (SPDT) relay switches or double-pole double-throw (DPDT) relay switches. A normally CLOSED contact of the relay switch S5 is coupled to the relay switch S1, and a normally OPENED contact of the relay switch S5 is coupled to the relay switch S3. The normally CLOSED contact of the relay switch S6 is coupled to the relay switch S2, and the normally OPENED contact of the relay switch S6 is coupled to the relay switch S4. The relay switches S5 and S6 may supply one of the input voltage INPUT_A and the input voltage INPUT_B to the PFC converter. The relay circuit 504, the relay circuit 508 and the relay switches S5 and S6 as shown in FIG. 5 may also realize the functions of the relay circuit 108 and the relay circuit 112 included in the input redundant power supply circuit 100 shown in FIG. 1 according to one embodiment of the present disclosure.

Figure 6:
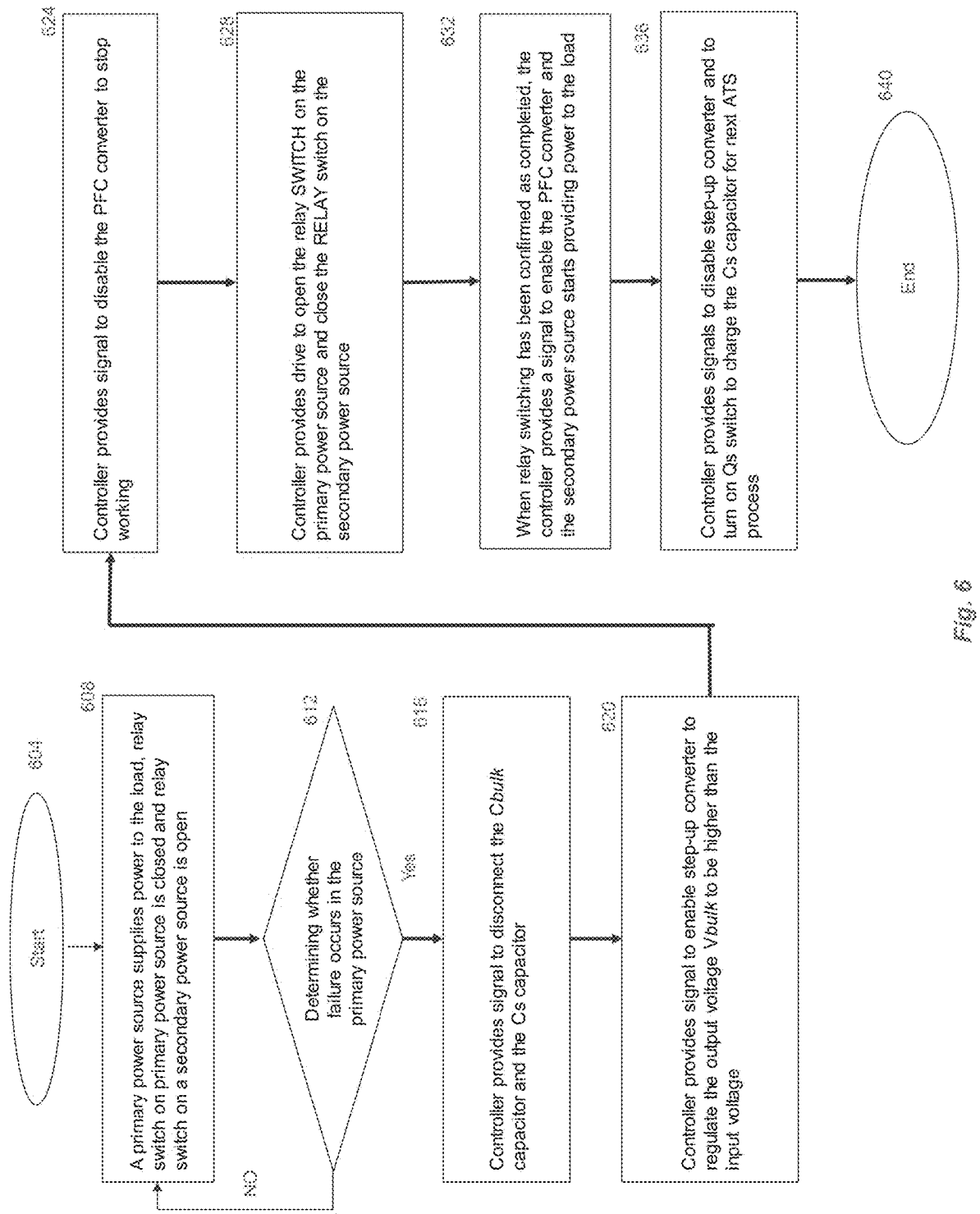
FIG. 6 is a flowchart of a method of controlling the input redundant power supply circuit in accordance with embodiments of the present disclosure.

FIG. 6 is a flowchart of a method of controlling the input redundant power supply circuit in accordance with embodiments of the present disclosure. While a general order for the steps of the method 600 of controlling the input redundant power supply circuit is show in FIG. 6, the method 600 can include more or fewer steps or can arrange the order of the steps differently than those shown in FIG. 6. Further, two or more steps may be combined into one step. Generally, the method 600 starts with a START operation 604 and ends with an END operation 640. The method can be executed on a set of computer-executable instructions executed by a data processing system and encoded or stored on a computer readable medium. Herein, the method 600 shall be explained with reference to systems and components, modules, software, data structures, user interfaces, etc. described above.

Method 600 may START at step 604 and proceed to step 608 where the controller provides control signals to CLOSE the relay switch for the primary power source when the primary power source is to be used to supply power to the load and to OPEN the relay switch for the secondary power source when the secondary power source is to be used as a backup power supply. Method 600 proceeds to decision step 612 where the controller determines, using a sensing circuit for example, whether a failure has occurred in the primary power source. If there is no failure in the primary power source at decision step 612 (NO), method 600 returns to step 608. If there is a failure in the primary power source at decision step 612 (YES), method 600 proceeds to step 616, where the controller provides a control signal to disconnect the Cbulk capacitor and the Cs capacitor. After disconnecting the Cbulk capacitor and the Cs capacitor, method 600 proceeds to step 620 where the controller provides a control signal to ENABLE the step-up converter and regulate the output voltage Vbulk higher than the input voltage. The voltage from the Cs capacitor is added to the voltage of the Cbulk capacitor to maintain the output voltage Vbulk higher than the input voltage. After the output voltage Vbulk has been regulated, method 600 proceeds to step 624 where the controller sends a control signal to DISABLE the PFC converter. After the PFC converter has been DISABLED, method 600 proceeds to step 628 where the controller provides control signals to OPEN the relay switch on the primary power source and CLOSE the relay switch on the secondary power source. Afterwards, method 600 proceeds to step 632 where the controller sends control signals to ENABLE the PFC converter and the secondary power source starts providing energy to the load after it is confirmed the relay switching for OPENING the relay switch on the primary power source and CLOSING the relay switch on the secondary power source has been completed.

Method 600 proceeds to step 636 where the controller sends control signals to DISABLE the step-up converter and to turn ON the Qs switch to charge the Cs capacitor for the next ATS process. The current used to charge the Cs capacitor is limited in order to prevent a surge current on the relay switches when connecting the Cbulk capacitor and the Cs capacitor after the controller provides control signals to OPEN the relay switch on the primary power source and CLOSE the relay switch on the secondary power source. Method 600 may END at step 640.

According to an alternative embodiment of the present disclosure, the method discussed above may apply when a secondary power source supplies backup power to the load and the relay switch on the secondary power source is CLOSED and the relay switch on the primary power source is OPEN.

Any of the steps, functions, and operations discussed herein can be performed continuously and automatically.

The exemplary systems and methods of this disclosure have been described in relation to an input redundant power supply circuit. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include an input redundant power supply circuit, including a power converter, a relay switch unit, a control unit, a high capacity capacitor and a step-up converter. The relay switch unit includes a first relay circuit coupled to a first power source and a second relay circuit coupled to a second power source. The control unit is configured to control the relay switch unit so that the power converter is supplied power by the first power source or the second power source. The high capacity capacitor is powered by the power converter and the step-up converter is coupled between the power converter and the high capacity capacitor. The step-up converter maintains a voltage across the high capacity capacitor higher than a voltage of the first power source or a voltage of the second power source when the relay switch unit switches from one of the first power source and the second power source to the other of the first power source and the second power source.

Aspects of the above input redundant power supply circuit further include a first sensing circuit coupled to the first relay circuit and configured to sense whether the first power source works properly and supply a first sense signal to the control unit for indicating whether the first power source works properly and a second sensing circuit coupled to the second relay circuit and configured to sense whether the second power source works properly and supply a second sense signal to the control unit for indicating whether the second power source works properly.

Aspects of the above input redundant power supply circuit include the relay switch unit is configured to supply the voltage of the first power source to the power converter by default.

Aspects of the above input redundant power supply circuit include the control unit is configured to generate a first control signal used to control the relay switch unit to decouple one of the first power source and the second power source from the power converter and a second control signal used to control the relay switch unit to couple the other of the first power source and the second power source to the power convener.

Aspects of the above input redundant power supply circuit include the control unit is configured to enable the step-up converter before the relay switch unit decouples the one of the first power source and the second power source from the power converter in response to the first control signal.

Aspects of the above input redundant power supply circuit include the control unit is configured to disable the power converter to stop working before the relay switch unit decouples the one of the first power source and the second power source from the power converter in response to the first control signal.

Aspects of the above input redundant power supply circuit include the control unit is configured to enable the power converter to start working after receiving confirmation that the relay switch unit couples the other of the first power source and the second power source to the power converter in response to the second control signal.

Aspects of the above input redundant power supply circuit include the control unit is configured to disable the step-up converter after the relay switch unit couples the other of the first power source and the second power source to the power converter in response to the second control signal.

Aspects of the above input redundant power supply circuit include the first power source and the second power source including an AC power source or a DC power source.

Aspects of the above input redundant power supply circuit include the power converter stops working after a failure has been detected in the first power source or the second power source.

Aspects of the above input redundant power supply circuit include the power converter is configured to increase the voltage of one of the first power source or the second power source connected by the relay switch unit.

Embodiments include a method of controlling an input redundant power supply circuit, including detecting that a relay switch of a primary power source that supplies power to a load via a high capacity capacitor is closed and a relay switch of a secondary power source is open, determining that a failure has occurred with the primary power source, enabling a step-up converter and maintaining by the step-up converter a voltage across the high capacity capacitor higher than a voltage of the secondary power source when the relay switch of the primary power source is open and the relay switch of the secondary power source is closed.

Aspects of the above method of controlling an input redundant power supply circuit further include disabling a power converter provided between the primary and secondary power sources and the load.

Aspects of the above method of controlling an input redundant power supply circuit include disabling the power converter before the relay switch of the primary power source is open, and the relay switch of the secondary power source is closed.

Aspects of the above method of controlling an input redundant power supply circuit further include enabling the power converter after confirmation that the relay switch of the primary power source is open, and the relay switch of the secondary power source is closed.

Aspects of the above method of controlling an input redundant power supply circuit further include disabling the step-up converter.

Aspects of the above method of controlling an input redundant power supply circuit include disabling the step-up converter after the power converter has been enabled.

Aspects of the above method of controlling an input redundant power supply circuit include the primary power source and the secondary power source include an AC power source or a DC power source.

Aspects of the above method of controlling an input redundant power supply circuit include the power converter is configured to increase voltages of the primary and secondary power sources.

Embodiments include a method of controlling an input redundant power supply circuit, including detecting that a relay switch of a primary power source that supplies power to a load via a high capacity capacitor is closed and a relay switch of a secondary power source is open, determining that a failure has occurred with the primary power source, disconnecting an additional power source supplied with power from the primary power source from the high capacity capacitor, enabling a step-up converter and maintaining by the step-up converter a voltage across the high capacity capacitor higher than a voltage of the secondary power source when the relay switch of the primary power source is open and the relay switch of the secondary power source is closed. The voltage from the additional power source is added to the voltage of the high capacity capacitor to maintain the voltage across the high capacity capacitor higher than the voltage of the secondary power source. The method also includes limiting charging of the additional power source to prevent a surge current on the relay switches when connecting the additional power source to the high capacity capacitor after the relay switch of the primary power source is open and the relay switch of the secondary power source is closed.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"). "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. An input redundant power supply circuit, comprising:
   a power converter,
   a relay switch unit comprising:
   a first relay circuit coupled to a first power source, and
   a second relay circuit coupled to a second power source;
   a control unit configured to control the relay switch unit so that the power converter is supplied power by the first power source or the second power source,
   wherein the control unit is configured to generate a first control signal used to control the relay switch unit to decouple one of the first power source and the second power source from the power converter and a second control signal used to control the relay switch unit to couple the other of the first power source and the second power source to the power converter,
   a high capacity capacitor powered by the power converter; and
   a step-up converter coupled between the power converter and the high capacity capacitor, wherein the control unit is configured to enable the step-up converter before the relay switch unit decouples the one of the first power source and the second power source from the power converter in response to the first control signal, wherein the enabled step-up converter maintains a voltage across the high capacity capacitor higher than a voltage of the first power source or a voltage of the second power source before the relay switch unit switches from one of the first power source and the second power source to the other of the first power source and the second power source, wherein the control unit is configured to disable the power converter to stop working before the relay switch unit decouples the one of the first power source and the second power source from the power converter in response to the first control signal, and wherein the control unit is configured to disable the enabled step-up converter after the relay switch unit couples the other of the first power source and the second power source to the power converter in response to the second control signal.

2. The input redundant power supply circuit of claim 1, further comprising:

a first sensing circuit coupled to the first relay circuit and configured to sense whether the first power source works properly and supply a first sense signal to the control unit for indicating whether the first power source works properly; and a second sensing circuit coupled to the second relay circuit and configured to sense whether the second power source works properly and supply a second sense signal to the control unit for indicating whether the second power source works properly.

3. The input redundant power supply circuit of claim 1, wherein the first relay circuit is configured to supply the voltage of the first power source to the power converter by default.

4. The input redundant power supply circuit of claim 1, wherein the control unit is configured to enable the power converter to start working after receiving confirmation that the relay switch unit couples the other of the first power source and the second power source to the power converter in response to the second control signal.

5. The input redundant power supply circuit of claim 1, wherein the first power source and the second power source include an AC power source or a DC power source.

6. The input redundant power supply circuit of claim 1, wherein the power converter stops working after a failure has been detected in the first power source or the second power source.

7. The input redundant power supply circuit of claim 1, wherein the power converter is configured to increase the voltage of one of the first power source or the second power source connected by the relay switch unit.

8. A method of controlling an input redundant power supply circuit including a power converter electrically coupled between a primary power source and a secondary power source and a load via a step-up converter, the method comprising:

detecting that a relay switch of the primary power source that supplies power to the load via an electrically connected high capacity capacitor is closed and a relay switch of the secondary power source is open;

enabling the power converter by the primary power source;

determining that a failure has occurred with the primary power source;

enabling the step-up converter before the relay switch of the primary power source is open;

maintaining by the enabled step-up converter a voltage across the high capacity capacitor higher than a voltage of the secondary power source before the relay switch of the primary power source is open and the relay switch of the secondary power source is closed;

disabling the power converter provided between the primary and secondary power sources and the load before the relay switch of the primary power source is open;

providing power to the load from the secondary power source; and disabling the enabled step-up converter after the relay switch of the secondary power source is closed.

9. The method of controlling an input redundant power supply circuit according to claim 8, further comprising enabling the power converter after confirmation that the relay switch of the primary power source is open, and the relay switch of the secondary power source is closed.

10. The method of controlling an input redundant power supply circuit according to claim 8, further comprising disabling the step-up converter after the power converter has been enabled.

11. The method of controlling an input redundant power supply circuit according to claim 8, wherein the primary power source and the secondary power source include an AC power source or a DC power source.

12. The method of controlling an input redundant power supply circuit according to claim 8, wherein the power converter is configured to increase voltages of the primary and secondary power sources.

13. A method of controlling an input redundant power supply circuit including a power converter electrically coupled between a primary power source and a secondary power source and a load via a step-up converter, the method comprising:

detecting that a relay switch of the primary power source that supplies power to the load via an electrically connected high capacity capacitor is closed and a relay switch of the secondary power source is open;

enabling the power converter by the primary power source;

determining that a failure has occurred with the primary power source;

disconnecting an additional power source supplied with power from the primary power source and disconnecting the high capacity capacitor from the primary power source;

enabling the step-up converter before the relay switch of the primary power source is open;

maintaining by the enabled step-up converter a voltage across the high capacity capacitor higher than a voltage of the secondary power source before the relay switch of the primary power source is open and the relay switch of the secondary power source is closed;

disabling the power converter provided between the primary and secondary power sources and the load before the relay switch of the primary power source is open;

providing power to the load from the secondary power source;

disabling the enabled step-up converter after the relay switch of the secondary power source is closed; and limiting charging of the additional power source to prevent a surge current on the relay switches when connecting the additional power source to the high capacity capacitor after the relay switch of the primary power source is open and the relay switch of the secondary power source is closed.

14. The method of controlling an input redundant power supply circuit according to claim 13 wherein voltage from the additional power source is added to the voltage of the high capacity capacitor to maintain the voltage across the high capacity capacitor higher than the voltage of the secondary power source.

15. The method of controlling an input redundant power supply circuit according to claim 13, further comprising disabling the step-up converter after the power converter has been enabled.

16. The method of controlling an input redundant power supply circuit according to claim 13, wherein the primary power source and the secondary power source include an AC power source or a DC power source.

17. The method of controlling an input redundant power supply circuit according to claim 13, wherein the power converter is configured to increase voltages of the primary and secondary power sources.

18. The method of controlling an input redundant power supply circuit according to claim 8, wherein the power converter stops working after a failure has been detected in the primary power source or the secondary power source.

19. The method of controlling an input redundant power supply circuit according to claim 13, wherein the power converter stops working after a failure has been detected in the primary power source or the secondary power source.

20. The input redundant power supply circuit of claim 1, wherein the step-up converter is either a booster converter or an isolated switching converter.

* * * * *